US004001612B2

United States Statutory Invention Registration [19]

[11] Reg. Number: H1612

Rhein et al.

[45] Published: Nov. 5, 1996

[54] METHOD FOR MAKING SILARYLENE-SILOXANE POLYMERS

[75] Inventors: Robert A. Rhein; James C. Baldwin, both of Ridgecrest, Calif.

[73] Assignee: The United States of America as represented by the Secretary of the Navy, Washington, D.C.

[21] Appl. No.: 104,953

[22] Filed: Aug. 2, 1993

[51] Int. Cl.[6] ..... C08G 77/04

[52] U.S. Cl. ..... 528/34; 528/35; 528/21; 556/433

[58] Field of Search ..... 528/21, 34, 35; 556/432

[56] References Cited

U.S. PATENT DOCUMENTS

| | | | |
|---|---|---|---|
| 3,325,530 | 6/1967 | Wu | 528/34 |
| 3,350,350 | 10/1967 | Nitzsche et al. | 528/35 |
| 3,398,175 | 8/1968 | Leitheiser | 528/35 |
| 4,340,711 | 7/1982 | Evans | 528/21 |

*Primary Examiner*—Charles T. Jordan
*Assistant Examiner*—John R. Hardee
*Attorney, Agent, or Firm*—Robert J. Hampsch; Melvin J. Sliwka; John L. Forrest, Jr.

[57] ABSTRACT

A method for making silarylene-siloxane polymers having the Formula:

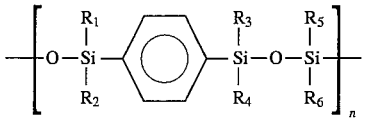

where $R_1$–$R_6$ are alkyl or aryl and n is an integer above about 50, wherein the rate of reaction and the degree of polymerization achieved when reacting disilanols with dichlorosilanes to form silarylene-siloxane polymers are unexpectedly enhanced by a subsequent charge into the reaction medium of a tertiary amine which functions as an acid acceptor.

11 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR MAKING SILARYLENE-SILOXANE POLYMERS

BACKGROUND OF THE INVENTION

1. Field of the Invention

This invention relates to improved manufacture of silarylene-siloxane polymers, particularly, silphenylene siloxane polymers, having superior elastomeric properties and improved thermal stability.

2. Description of Related Art

Polymers having alternating silarylene-siloxane units have previously been found to be useful in the aerospace field, as elastomers because of their superior high temperature stability and low temperature flexibility. In recent years, the need for bulkier molecular weight units and higher molecular weight siloxane polymer chains has arisen in order to meet the severe thermal demands for future aerospace missions. However, previous attempts at manufacturing such bulkier siloxane polymers have been unduly limited with regard to the molecular weight achieved, have been undesirably slow, taking numerous hours, if not several days, to achieve completion of the reactions, involve tedious process steps, and require undesirably expensive raw materials.

For example, U.S. Pat. No. 3,325,530 issued Jun. 13, 1967, disclosed early work In the silarylene-siloxane polymer field performed by Wu. Wu's process was limited to a slow, dropwise, addition of diphenyldichlorosilane to a solution of the disilanol [1,4-bis(diphenylhydroxysilyl) benzene], pyridine and tetrahydrofuran. Pyridine served as the hydrogen chloride acceptor, and the reaction mixture was stirred, taking for example sixteen hours to complete the reaction. Then a resinous product was separated, having the formula:

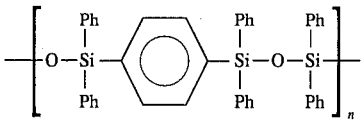

[1]

where n is 3 to 50 However, this process is limited to providing polymers having the number of repeating units ranging from not much more than 3 to 50.

It was later disclosed by the General Electric Company that the limitation regarding the above-described polymerization range of between 3 and 50 was because of polymer backbone cleavage from an equilibrium reaction between (a) the carbon-silicon bonds in the main polymer chain, and (b) the hydrogen chloride by-product, which reaction purportedly takes place before by-product neutralization by the pyridine acid acceptor. This work is described in C. Eaborn, *Organosilicon Chemistry, Second International Symposium on Organosilicon Chemistry, Bordeaux,* Jul. 9–12, 1968, Butterworth, London, Volume 11, page 375.; and V. Bazant, V. Chalovsky, and J. Rathousky, *Organosilicon Compounds,* volume 1, pages 225–226, Academic New York (1965).

Silarylene-siloxane elastomeric polymers for modern day and future use in the aerospace industry require much higher degrees of polymerization ranging, for example, from 90 to about 350 and molecular weights ranging from 27,000 to about 123,000. Accordingly, the Wu process has long been abandoned while the industry, for the most part, has turned to "Pike's reaction" for commercial production of the higher molecular weight polymers. R. M. PIke, *Journal of Polymer Science,* volume 50, page 151 (1961). Pike reported that diaminosilanes condense with silanols to form polysiloxanes under extremely mild conditions in which "basic rather than acidic" by-products were formed without self-condensation of silanols. This route has been commercially adopted, as an alternative to the reaction of dlchlorosilanes with disilanols because of the apparent elimination of the above described polymer backbone cleavage from the attack of reaction by-products. See R. L. Merker and M. J. Scott, *Journal of Polymer Science, A,* 15 (1964); L. W. Breed, et. al. *Journal of Polymer Science, A*-1, 5, 2745 (1967); R. E. Burks, Jr., et. al., *Journal of Polymer Science, Polymer Chemistry Edition,* 11, 319–326 (1973); C. U. Pittman, Jr., et. al., *Journal of Polymer Science, Polymer Chemistry Edition,* 14, 1715–1734 (1976), all of which report various "Pike reactions" of diaminosilanes having the formula:

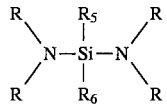

[2]

with disilanols having the formula:

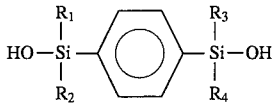

[3]

to produce the higher molecular weight silphenylene siloxane polymers of higher degrees of polymerization having the formula:

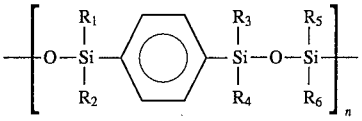

[4]

where $R_1$–$R_6$, are all either methyl or phenyl groups and n is an integer above 90. However, these reactions require the slow addition of the diaminosilanes, which are less readily available than dichlorosilanes, to a refluxing solution of the disilanols in toluene. These procedures also involve tedious incremental work and unduly long reaction times, where precipitation and purification sometimes take as long as 24 hours.

More recently, Yu-Chin-Lai, et. al., *Journal of Polymer Science, Polymer Chemistry Edition,* 20, 2277–2288 (1982), reinvestigated the preparation of alternating silphenylene-siloxane polymers from reacting disilanols and dichlorosilanes, partly because these monomers are more readily available than diaminosilanes. However, this required particular monitoring techniques in order to achieve the more desirable higher molecular weight polymers from dichlorosilane monomers. The process also flushed inert gas through the reaction medium to rid the system of HCI in an effort to avoid the polymer cleavage problem. Although Yu-Chin-Lai determined that the degree of polymerization could be substantially enhanced, the need to follow this particularly meticulous and extensive monitoring technique together with the need to continually flush the reaction medium with nitrogen while the reaction is allowed to reach equilibrium, is commercially undesirable.

Accordingly, it would be a substantial advancement, and an unexpected discovery in the art, to manufacture higher molecular weight silphenylene-siloxane polymers having over 50 units, using the dichlorosilane monomer, in a quick and instantaneous reaction which negates the need for flushing inert gas through the reaction medium, negates having to slowly add the monomers, and negates continually monitoring the development of polymerization.

SUMMARY OF THE INVENTION

It is an object of the present invention to provide a new and improved method for manufacturing higher molecular weight silphenylene-siloxane polymers without having to employ either diaminosilane monomers or the "Plke's reaction".

It is a further object of the present invention to provide a new and improved method for the manufacture of silphenylene-siloxane polymers from dichlorosilane, having higher molecular weights, and higher degrees of polymerization, without the need for flushing inert gas through the reaction mixture.

It is a still further object of the present invention, to provide a new and improved method for manufacturing silphenylene-siloxane polymers from reacting disilanol and dichlorosilane monomers in the presence of a tertiary amine acid acceptor without polymer backbone cleavage from hydrogen chloride by-products.

These objects and others, which will become more apparent from the following Detailed Description and the Examples, are unexpectedly fulfilled by reacting disilanol with dichlorosilane in the presence of an inert solvent and a tertiary amine acid acceptor, wherein the acid acceptor is rapidly charged into the reaction medium subsequent to fully admixing the disilanol and dichlorosilane monomers.

DETAILED DESCRIPTION AND PREFERRED EMBODIMENTS

In the process of the present invention, disilanol having the following formula:

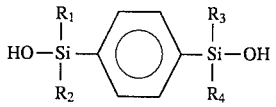

[5]

wherein $R_1$–$R_4$ are independently aromatic or aliphatic monovalent hydrocarbon radicals, preferably methyl or phenyl, particularly methyl, is dissolved in an inert solvent. The disilanols are commercially available from any of a number of manufacturer's; however, if desired, they may be synthesized by modifications of the hydrolysis procedure given by Merker et. al., *Journal of Polymer Science, A,* to 15, (1964); the method of Wu in U.S. Pat. No. 3,325,530; the method of Burks et. al., *Journal of Polymer Science Polymer Chemistry Edition,* 11, 319–326 (1973); the method of Pittman et. al., *Journal of Polymer Science, Polymer Chemistry Edition,* 14, 1715–1734 ( 1976); or the method of Dvornic et. al., *Journal of Polymer Science. Polymer Chemistry Edition,* 20, 951 (1982). A preferred disilanol is 1,4- bis(dimethylhydroxysilyl)benzene (formula [5] wherein $R_1$–$R_4$ are methyl).

The inert solvent can be any material which is a solvent for the reactants and which is inert under the spontaneous conditions of the reaction, e.g., THF, glymes, ethers, and other polar aprotic solvents. A particularly desirable solvent is tetrahydrofuran.

Next, dichlorosilane having the formula:

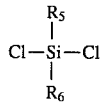

[6]

wherein $R_5$ and $R_6$ are independently an aromatic or aliphatic monovalent hydrocarbon radicals, is added to the reaction mixture, directly.

The dichlorosilanes are readily available from any number of commercial sources. A particularly preferred dichlorosilane is dimethyldichlorosilane. Diphenyldichlorosilane may also be employed as can phenylmethyldichlorosilane. Preferably, the disilanol and dichlorosilane monomers are employed in equimolar proportions.

It is important to the process of the present invention that an acid acceptor material, almost any compatible base which is not too nucleophilic, is added to the reaction mixture after the monomers have been dissolved in the reaction medium. A prefered acid acceptor is a tertiary amine, Although the reason is not completely understood, it appears that the acid acceptor, if added after admixture of the monomers will receive the hydrogen chloride generated during the reaction in a manner that results in less polymer backbone cleavage than previously occurred when the acid acceptor material was integrally dissolved with the disilanol monomer prior to the slow addition of the dichlorosilanes. The preferred tertiary amine for use as an acid acceptor is pyridine. The pyridine is employed in an amount effective to provide at least one mole of pyridine per mole of the dichlorosilane, although the reaction can be satisfactorily conducted with an amount of acid acceptor ranging from 0.25 to 5 moles per mole of the dichlorosilane.

The reaction is an exothermic reaction. Accordingly, external cooling may be required in order to maintain the preferred temperature of from about 25° to about 50° C.

Upon adding the acid acceptor material a substantial amount of flocculent precipitant forms which is believed to be (acid acceptor)hydrochloride, and substantially thickens the reaction mixture. Unlike previous processes for the manufacturer of silphenylenesiloxane polymers, the present invention enables the reaction to be stirred for substantially less than 1 hour, preferably about 5 minutes, wherein, the reaction goes to substantial completion.

It has been discovered in accordance with the present invention that the by-product material may be separated from the desired product by aqueous extraction. That is, after the reaction goes to completion, water is added, resulting in dissolution of the precipitant in the aqueous phase, leaving a two-phase transparent mixture. The organic phase containing the desired product can thus be separated and the solvent thereafter, removed by vacuum evaporation.

Silphenylene-siloxane polymers having the formula:

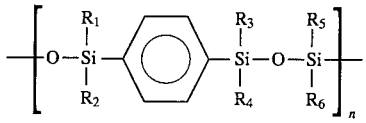

[7]

where $R_1$–$R_6$ are independently alkyl or aryl and n is an integer above about 50, are made possible by the process of the present invention.

The following examples are given for the purpose of illustration and should not be considered as limiting in any way, the full scope of the invention as covered in the appended claims. All parts and percentages mentioned in these examples are by weight.

EXAMPLE 1

Preparation of Poly[1,4- bis (oxydimethylsilyl)benzene, dimethylsilane].

In this example, 2.54 grams of 1,4-bis(dimethylhydroxysilyl)benzene were dissolved in 12.7 milliliters tetrahydrofuran, and 1.36 milliliters dichlorodimethylsilane were added. Then, 1.814 milliliters pyridine were added to this solution rapidly, and the mixture stirred vigorously. Because the reaction was exothermic, external cooling was applied to maintain a temperature of about 30°. A substantial amount of flocculant precipitant formed (assumed to be pyridine hydrochloride), substantially thickening the mixture. The vigorous stirring was maintained for five minutes, where upon the reaction went to completion. Then 12.7 milliliters water was added, dissolving the precipitant in the aqueous phase of a two-phase transparent mixture. The organic phase was separated, and the solvent removed by vacuum evaporation, leaving 2.95 grams of viscous polymer identified as poly[1,4-bis(oxydimethylsilyl)benzene, dimethylsilane].

EXAMPLE 2

Preparation of poly[1,4-bis(oxydimethylsilyl) benzene, methylphenylsilane].

In this example, 5.44 grams of 1,4-bis(hydroxydimethylsilyl)benzene were dissolved in 27.2 grams tetrahydrofuran. Then 3.9 milliliters of methylphenyldichlorosilane were added. The dichlorosilane was added dropwise to reduce any heat generated from the exothermic reaction. Subsequently, 3.9 milliliters pyridine was added and vigorous stirring maintained for about 5 minutes. The precipitant formed and 27 milliliters of water was added dissolving the precipitant and resulting in a two-phase transparent mixture. The organic phase was separated, and the solvent was vacuum evaporated. Then 37 milliliters of methanol was added and the polymer phase was again subjected to vacuum evaporation leaving the viscous polymer. The solution viscosity in tetrahydrofuran at 30° C. was 0.088. The infrared spectrum showed absorbance at the following wave numbers ($cm^{-1}$): 3050 (w), 1590 (w), phenyl-H; 2950 (m), 1407 (w), 1255 (s), Si-CH; 1380 (m), 822 (s), 700, 730 (m), phenyl; 1430 (m), 1140 (s), Si-Phenyl; 1030–1080 (sb), Si-Osi.

The proton NMR spectra for this polymer, showed a singlet at 0.12 ppm (Si-CH) and a broad doublet at 7.1, 7.3 ppm (phenyl-H), with peak area ratio 1.77; expected is 1.67. The polymer is stable to above 300° C. This is a superior thermal stability to the known thermally stabled polymer of this sort, prepared by prior art methods.

EXAMPLE 3

Chain extension of the polymers created in Examples 1 and 2 was carried out using KOH in a method well known in the art. See, C. Eaborn, *Organosilicon Chemistry, Second International Symposium on Organosilicon Chemistry, Bordeaux,* July 9–12, 1968, Butterworth, London, Volume 11, page 375. Other ring extension methods could also be used to create polymers with DPs much greater than 90.

Since various modifications of the invention will occur to those skilled in the art, the invention is not to be taken as limited except by the scope of the appended claims.

What is claimed is:

1. A method for making silarylene-siloxane polymers comprising the steps:

(a) reacting in inert solvent a disilanol with a dichlorosilane, the disilanol having the formula:

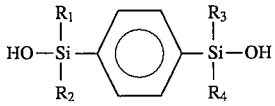

where $R_1$, $R_2$, $R_3$, and $R_4$ are independently selected form the group consisting of alkyl and aryl radicals, the dichlorosilane further having the formula:

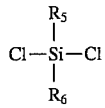

wherein $R_5$ and $R_6$ are independently selected from the group consisting of alkyl and aryl radicals;

(b) adding an effective amount of an acid acceptor;

(c) stirring for less than 1 hour; and (d) isolating the polymer.

2. The method of claim 1, wherein said disilanol and said dichlorosilane are added in equivalent amounts.

3. The method of claim 1, wherein the reaction is maintained at from 25° C. to 50° C. by external cooling.

4. The method of claim 1, wherein the acid acceptor is a tertiary amine.

5. The method of claim 1, wherein stirring is effected for 5 minutes.

6. The method of claim 1, wherein the by-product residue is separated by aqueous extraction.

7. The method of claim 1 wherein $R_1$, $R_2$, $R_3$, $R_4$, $R_5$, and $R_6$ are methyl.

8. The method of claim 1, wherein $R_1$, $R_2$, $R_3$, $R_4$, and $R_5$ are methyl, but $R_6$ is phenyl.

9. The method of claim 1, wherein the acid acceptor is pyridine.

10. A method for making silarylene-siloxane polymers comprising the steps:

(a) reacting in inert solvent a disilanol with a dichlorosilane, the disilanol having the formula:

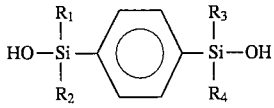

where $R_1$, $R_2$, $R_3$, and $R_4$ are independently selected from the group consisting of alkyl and aryl radicals, the dichlorosilane further having the formula:

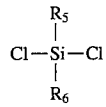

wherein $R_5$ and $R_6$ are independently selected from the group consisting of alkyl and aryl radicals;

(b) adding an effective amount of an acid acceptor;

(c) stirring for less than 1 hour; and (d) isolating the polymer, whereby polymer backbone cleavage by attack form acid by-products reacting with carbon-silicon bonds, and undesirable by-product condensation is negated without the need for continually flushing inert gas through the reaction mixture to remove acid by-products and without retardation and monitoring of monomer addition and polymer formation.

11. Silarylene-siloxane polymers having the formula:

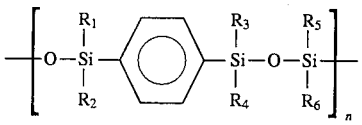

where $R_1$–$R_6$ are alkyl or aryl and n is an integer above about 50, made by the process comprising the steps:

(a) reacting in inert solvent a disilanol with a dichlorosilane, the disilanol having the formula:

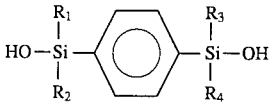

where $R_1$, $R_2$, $R_3$, and $R_4$ are independently selected from the group consisting of alkyl and aryl radicals, the dichlorosilane further having the formula:

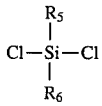

wherein $R_5$ and $R_6$ are independently selected form the group consisting of alkyl and aryl radicals;

(b) adding an effective amount of an acid acceptor;

(c) stirring for less than 1 hour; and (d) isolating the polymer.

* * * * *